(12) United States Patent
Dziekonski

(10) Patent No.: US 12,241,873 B2
(45) Date of Patent: Mar. 4, 2025

(54) DYNAMIC AUTOCLAVE TESTING SYSTEM

(71) Applicant: Mitchell Z. Dziekonski, Stafford, TX (US)

(72) Inventor: Mitchell Z. Dziekonski, Stafford, TX (US)

(73) Assignee: Mitchell Z. Dziekonski, Stafford, TX (US)

( * ) Notice: Subject to any disclaimer, the term of this patent is extended or adjusted under 35 U.S.C. 154(b) by 249 days.

(21) Appl. No.: 17/730,652

(22) Filed: Apr. 27, 2022

(65) Prior Publication Data
US 2022/0357253 A1     Nov. 10, 2022

Related U.S. Application Data

(60) Provisional application No. 63/185,496, filed on May 7, 2021.

(51) Int. Cl.
*G01N 3/12* (2006.01)
*G01N 3/20* (2006.01)

(52) U.S. Cl.
CPC .............. *G01N 3/12* (2013.01); *G01N 3/20* (2013.01); *G01N 2203/0202* (2013.01); *G01N 2203/0274* (2013.01)

(58) Field of Classification Search
CPC .... G01N 3/12; G01N 3/20; G01N 2203/0202; G01N 2203/0274; G01N 3/08; G01N 2203/0016; G01N 2203/0023; G01N 2203/0026; G01N 2203/0232; G01N 2203/0234; G01N 2203/024; G01N 2203/0254; G01N 3/18
See application file for complete search history.

(56) References Cited

U.S. PATENT DOCUMENTS

| | | | | | |
|---|---|---|---|---|---|
| 2,884,986 | A | * | 5/1959 | Heldenbrand | B21D 3/00 72/367.1 |
| 2,896,445 | A | * | 7/1959 | McNabb | G01M 3/2846 73/49.6 |
| 2,907,202 | A | * | 10/1959 | McConnell | G01M 3/2846 72/31.04 |
| 4,211,107 | A | * | 7/1980 | Sleeter | G01N 3/12 73/49.6 |

(Continued)

FOREIGN PATENT DOCUMENTS

| | | | | | |
|---|---|---|---|---|---|
| CN | 105466778 | A | * | 4/2016 | ............. G01N 27/00 |
| CN | 107576562 | A | | 1/2018 | |

(Continued)

OTHER PUBLICATIONS

Extended European Search Report for Application No. 22172150.9 mailed Oct. 10, 2022, 8 pages.

(Continued)

*Primary Examiner* — Freddie Kirkland, III
(74) *Attorney, Agent, or Firm* — Fletcher Yoder, P.C.

(57) ABSTRACT

A test system includes subsystems for application to a test sample of a range of conditions that might be encountered in an actual application. Conditions may include the presence of particular fluid environments, temperatures, pressures, and mechanical loads including tensile and bending loads. The system is particularly suited for elongated samples such as tubular products used in oil and gas applications, though a range of samples may be tested.

20 Claims, 5 Drawing Sheets

(56) References Cited

U.S. PATENT DOCUMENTS

| | | | | |
|---|---|---|---|---|
| 4,458,522 | A * | 7/1984 | Toelke | G01M 3/2846 |
| | | | | 73/49.5 |
| 4,516,431 | A * | 5/1985 | Heldenbrand | G01N 3/10 |
| | | | | 73/831 |
| 5,007,284 | A * | 4/1991 | Slone | G01M 13/005 |
| | | | | 73/9 |
| 8,731,849 | B2 * | 5/2014 | Westra | G01M 3/2815 |
| | | | | 702/50 |
| 9,044,802 | B2 * | 6/2015 | Evans | B21D 31/04 |
| 9,291,537 | B2 * | 3/2016 | Ren | G01N 3/08 |
| 10,241,018 | B2 * | 3/2019 | Zafred | G01N 3/56 |
| 11,002,647 | B2 * | 5/2021 | Kuroda | G01N 3/08 |
| 2007/0017300 | A1 * | 1/2007 | Bushey | G01N 3/02 |
| | | | | 73/856 |
| 2008/0264179 | A1 | 10/2008 | Dee et al. | |
| 2010/0313672 | A1 * | 12/2010 | Dee | G01N 3/04 |
| | | | | 73/851 |
| 2011/0232355 | A1 * | 9/2011 | Evans | B21D 31/04 |
| | | | | 72/367.1 |
| 2015/0330883 | A1 * | 11/2015 | Ren | G01N 3/18 |
| | | | | 73/834 |
| 2019/0242799 | A1 * | 8/2019 | Kuroda | G01N 3/04 |
| 2020/0182761 | A1 | 6/2020 | Shin et al. | |

FOREIGN PATENT DOCUMENTS

| | | |
|---|---|---|
| CN | 105466778 B | 9/2019 |
| JP | 58-001241 A | 1/1983 |
| JP | 61-097550 A | 5/1986 |
| JP | 2013-108952 A | 6/2013 |
| JP | 2020-534544 A | 11/2020 |

OTHER PUBLICATIONS

Office Action in Japanese Application No. 2022-076691 mailed Jul. 3, 2023, with English translation, 8 pages.

* cited by examiner

DYNAMIC AUTOCLAVE TESTING SYSTEM

CROSS-REFERENCE TO RELATED APPLICATIONS

This application claims priority from and the benefit of U.S. Provisional Application Ser. No. 63/185,496, entitled "Dynamic Autoclave Testing System," filed May 7, 2021, which is hereby incorporated by reference in its entirety.

BACKGROUND

The invention relates to testing apparatus, and particularly to apparatus that can subject samples to testing under a unique combination of conditions.

Many construction and mechanical equipment fields have demanding requirements for components, including strength and resistance to tensile and bending loads, resistance to environmental effects, pressures, temperatures, and so forth. In many instances, these properties may be known from general specifications of the materials (e.g. metals), or may be tested on relatively small coupons. In such cases, an attempt can be made to extrapolate the known properties to other or different conditions of use, and to different types and geometries of parts.

However, such techniques generally do not provide the ability to test multiple conditions when combined to simulate actual use. Consequently, assumptions made from known material properties may not be reliable or may even be substantially different from those that actual parts will encounter. Where the applications require a high degree of reliability, then, engineers may have few options other than overbuilding components with an acknowledged risk of failure.

There is a need in the field for improved devices techniques for testing samples that can more realistically obtain data in a combination of demanding conditions.

BRIEF DESCRIPTION

The present disclosure sets forth a testing apparatus comprising an elongated chamber in which a sample may be secured, the chamber being sealable to capture a fluid environment therein. A pressurizing system, in operation, creates a desired pressure the fluid environment, while a thermal system, in operation, creates a desired temperature in the fluid environment. A first loading system that, in operation, imposes a tensile or compressive load on the sample, and a second loading system that, in operation, imposes a bending load on the sample. By virtue of all of these subsystems, testing of the sample may comprise any combination or all of desired fluid environment, temperature, tensile and/or compressive load, and tensile load.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure sets forth a novel system designed to permit testing of samples under a combination of conditions, including pressures, temperatures, bending loads, and tensile (or compression) loads. The system may permit large samples to be tested, including actual production parts, particularly elongated parts and components. In particular, the system is well adapted for testing of tubular products such as those used in oil and gas exploration, well drilling, and mineral production. Environments encountered in subterranean and subsea environments may be simulated by the filling of any desired fluid in the system, and application of pressures and temperatures that may be present. Under such conditions, in combination, mechanical loading may be applied, and data taken to analyze performance of the sample.

Figure 1:
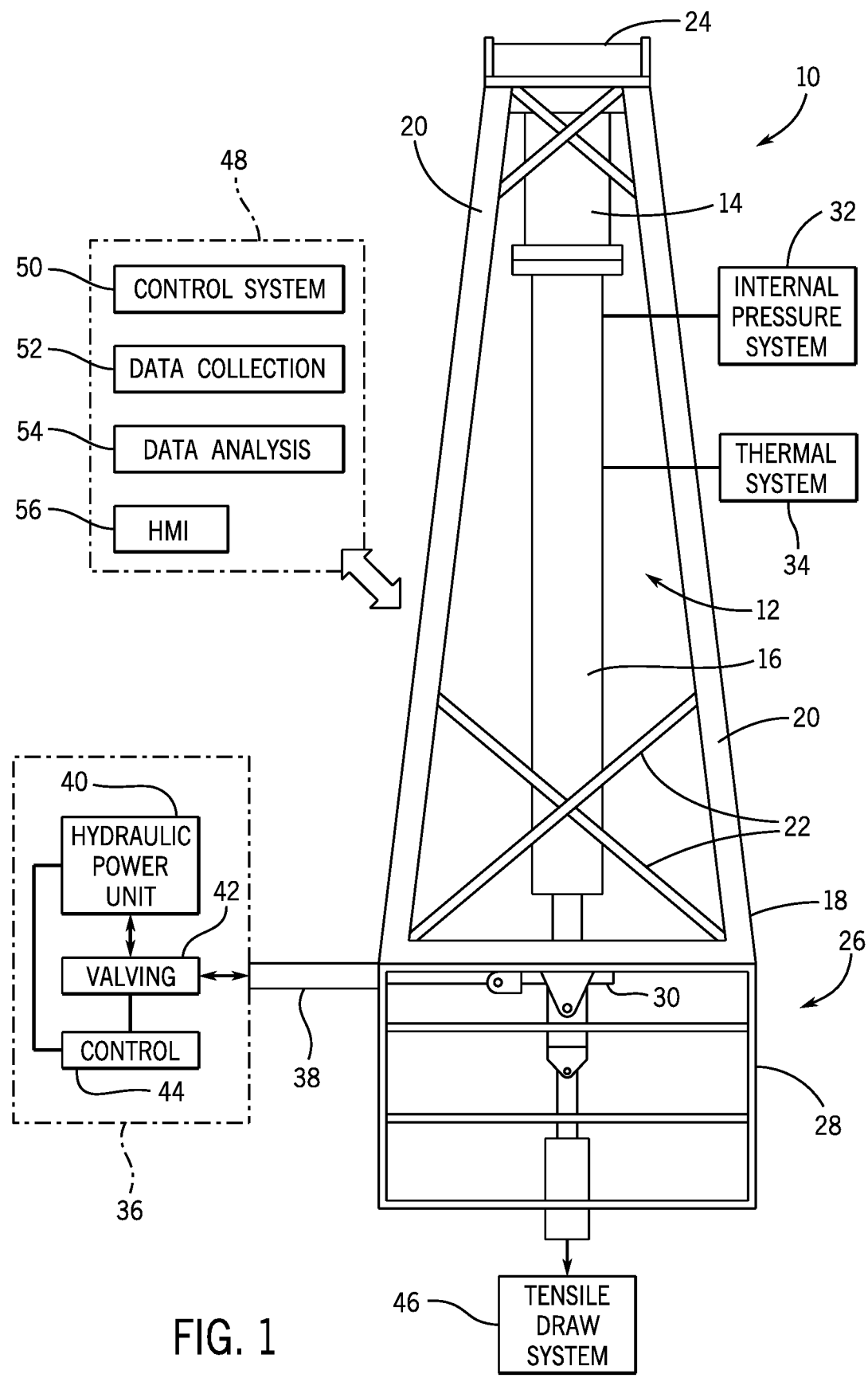
FIG. 1 is a diagrammatical representation of an exemplary testing system.

Turning to the drawings, FIG. 1 illustrates an exemplary testing system 10 that permits combined condition testing of elongated samples. The system has an elongated chamber/autoclave 12 that itself comprises a fixed chamber assembly 14 and an elongated movable or flexible assembly 16. The two assemblies are joined via a sealed flange but may be separated for loading of samples, inspection, maintenance, and so forth. The fixed chamber assembly 14 has a closed end (not separately shown), and a heavy cylindrical wide wall that can contain pressures of up to at least 35,000 PSI. The flexible assembly 16 can contain similar pressures, but can be flexed under the influence of loading systems as discussed below. Both wetted parts (basically the internal and sealing surfaces) of both assemblies are made of a metal capable of resisting corrosion from a wide range of fluids that may be loaded in the chambers. Metals presently contemplated include, for example, specialty steels, stainless steel, nickel alloys, and titanium alloys.

The chamber assemblies 14 and 16 are secured within a framework 18 that holds them in place, and that provides an integral support structure to resist loading applied to the chambers and sample. In the illustrated embodiment, the framework 18 comprises side members 20 and a truss or reinforcing structure 22. Any desired support structure may be provided, however, and it may take on any desired shape. In the illustrated embodiment, the side members 20 extend between a fixed end structure 24 and an opposite end structure 26 that allows for movement during application of bending loads as discussed below. These parts may be made of any suitable production stock, such as steel. A load extension 28 allows for mounting of the mechanical loading components. Some or all of these structures may be at least partially dismountable, and could be covered by guards or shields (not shown) during testing. In the load extension 28 a sliding thrust plate 30 is provided for application of mechanical loads as discussed below.

The system 10 includes systems, or subsystems that allow for the desired test conditions, all of which may be separately controlled under the direction of a centralized or common control and data collection system. In the embodiment of FIG. 1, for example, an internal pressure system 32 is coupled to one or both of the chamber assemblies, and allows the application of desired pressures to the sample positioned in the chambers. It is contemplated that many environments of interest may be simulated by filling the chambers with gasses, liquids, or a combination of these. For example, in the case of subterranean and/or subsea environments, the chambers may be filled with, for example, seawater, simulated seawater, corrosive liquids and gasses, and so forth. In general, it is anticipated that once loaded and sealed in the chambers, such fluids may be subjected to positive pressures (i.e., higher than atmospheric) by one or more pumps or compressors included in the internal pressure system 32. The internal pressure system 32 may also allow for purging the chambers. Moreover, although positive pressures may be of particular interest, the system may be capable of applying negative pressures (i.e., partial vacuum pressures) by use of one or more vacuum pumps. Presently contemplated pressures up to on the order of 35,000 PSI may be applied by the internal pressure system.

A thermal system 34 is provided that allows for the temperature of the chambers to be raised (or lowered) to desired test conditions. The thermal system may heat (or cool) the fluid in the chambers, or the internal volume surrounding the sample, or parts of the chamber structures, or some or all of these. In a presently contemplated embodiment, desired temperatures are provided by a thermal jacket surrounding the chamber, or internally via fluid feeds through a port of the chamber from a fluid heating or cooling system, having temperature ranges on the order of approximately OF (or lower) and up to 450 F or higher.

Mechanical loading of the sample may include bending loading, tensile (or compressive) loading, or any combination of these. As illustrated, a bending load system 36 applies bending loading by lateral movement of the flexible chamber assembly 16. In particular, in this embodiment a hydraulic cylinder 38 may be extended and retracted to move the sliding thrust plate 30. The cylinder is powered by pressurized hydraulic fluid from a hydraulic power unit 40 applied via appropriate valving 42 (e.g., directional control valving). Control circuitry 44 allows for control of the valving, as well as pressures applied to the cylinder as needed for movement during testing. It may be noted that, owing to the geometry of the support structure, a range of lateral motion may be offered by the cylinder 38 and plate 30. In a presently contemplated embodiment, for example, lateral movement on the order of approximately =/-2 ft. or more may be applied to provide bending over a sample length of 6 ft. or more (e.g., up to approximately 30 ft. Of course, other lateral ranges and lengths may be accommodated by appropriately dimensioning the flexible chamber assembly and framework.

Further, a tensile draw system 46 allows for application of tensile loads up to approximately 5,000 lbs. to approximately 250,000 lbs. and beyond. The components of system 46 may be similar to those of the bending load system 36, so those parts are not separately illustrated in the figure. In fact, in some embodiments, the two systems may be at least partially combined so that the same hydraulic power unit and valving allow for application of tensile loads to the sample (e.g., by retraction of a tensile loading hydraulic cylinder). It may also be noted that the system may be designed for application of compressive loads by slight modification of the illustrated arrangement (e.g., by capture of the thrust plate 30 so as to allow for extension of the cylinder of system 46). It may be further noted that both bending and tensile loads may be applied at the same time, or in any sequence. In the illustrated embodiment, the load-applying cylinder of the tensile loading system can move along with the sliding thrust plate 30 as it is displaced laterally by cylinder 38. In some embodiments, the framework, and particularly the components of the end structure 26 may be designed to allow for straight travel paths of the thrust plate (as illustrated) or arcuate travel paths, with the tensile load being applied uniformly or in any alternative way to the sample. For example, for straight travel paths, hydraulic pressures (and resulting forces) of the tensile system 46 may be altered as the thrust plate is displaced laterally to maintain the desired tensile load.

A control and interface system 48 is illustrated that allows for both control of the various subsystems, and for collection of data during tests. As illustrated, a control system 50 is provided for overall control of test conditions, protocols, presentation of data, and so forth. While this control and oversight may be separated for each subsystem, the illustrated common control allows for integrated control of application of complex combinations of loads. In practice, the control system 50 may comprise an appropriately programmed computer. A data collection component 52 cooperates with the subsystems and any instrumentation of the sample for logging tests, data entry by a test operator, and so forth. A data analysis component 54 allows for analysis of the test data (e.g., signal conversion, scaling, presentation of combined test conditions, graphical or numerical analysis, etc.). Finally, a human machine interface or HMI 56 is provided for permitting operator inputs, oversight, and control of the process. The HMI may include, for example, one or more computer monitors, input devices, and so forth.

Figure 2:
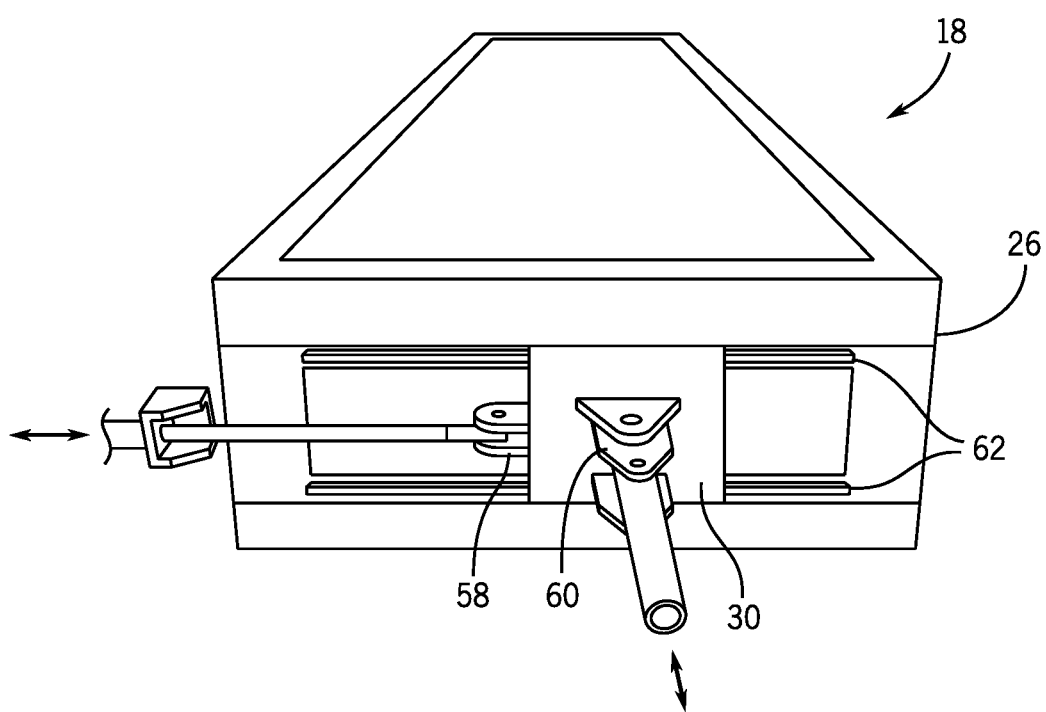
FIG. 2 is a detail of the system of FIG. 1 illustrating exemplary attachment and support structures for applying mechanical loads.

FIG. 2 illustrates exemplary details of how the bending and tensile loading components may be supported and connected to the plate 30 and framework. As shown, an attachment structure 58 (e.g., a clevis, tang, or other connection point) allows for attachment of the end of the shaft of the bending load cylinder. Another attachment structure 60 allows for connecting the tensile load cylinder (while permitting lateral movement of the tensile load cylinder with the plate 30). In this embodiment, the thrust plate 30 slides along rails 62 fixed to the end structure 26.

Figure 3:
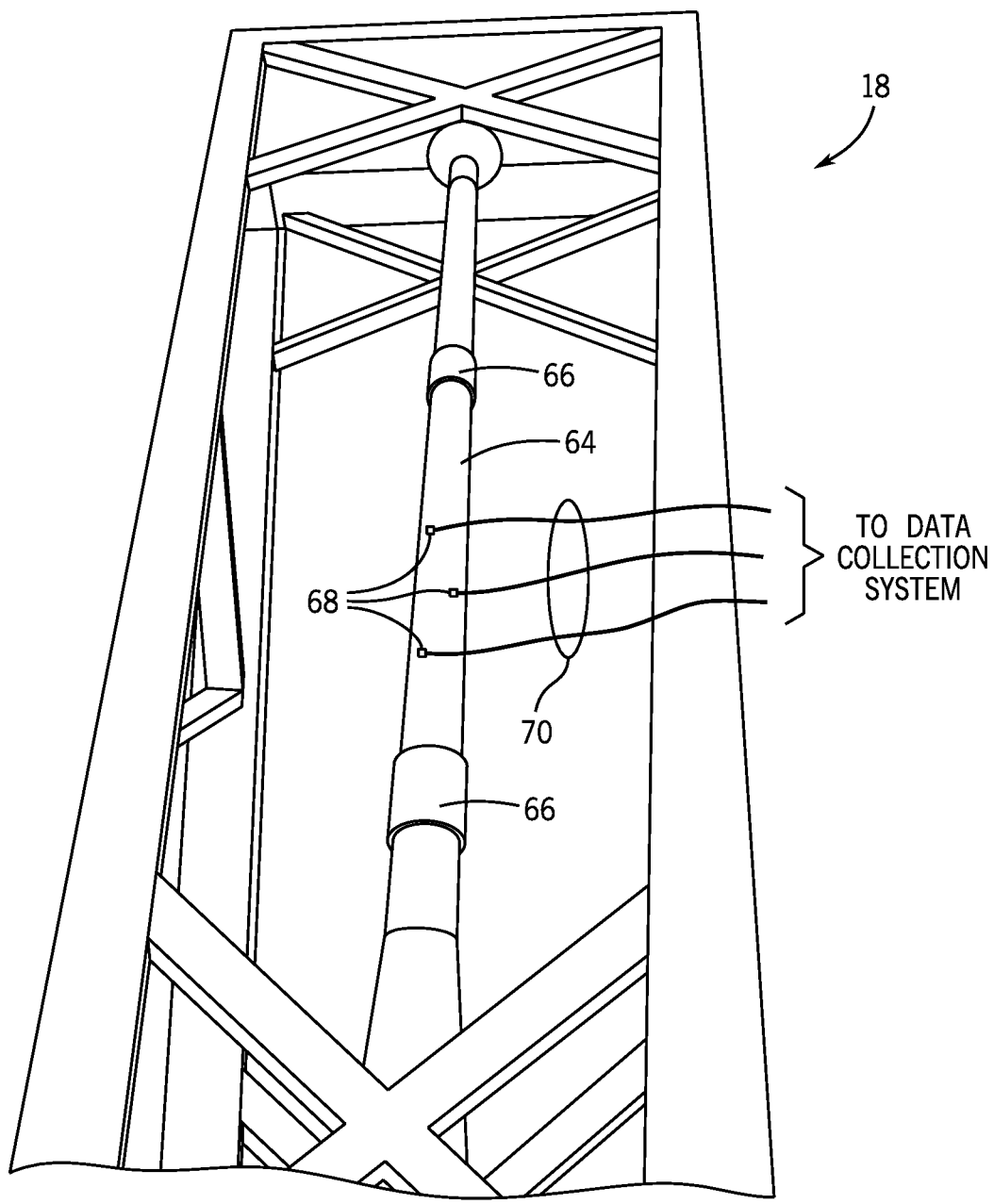
FIG. 3 is a diagrammatical representation of a test sample loaded in the system.

As noted above, a range of elongated samples may be tested in the system, including solid and tubular structures, such as drill pipe, production pipe, and so forth in oil and gas applications. The instrumentation of such samples may take any desired form, including by way of example, strain gauges. FIG. 3 shows an instrumented sample 64 loaded in the system but before final assembly of the chambers around the sample. Couplings or mounting ends 66 permit holding the sample in place and application of the mechanical loads. In this example, a series of instruments 68 (e.g., strain gauges) are secured to the sample, and conduits 70 allow for application of any signals to the instruments, as well as collection of resulting signals (for later conversion and analysis). It should be noted that in presently contemplated embodiments the couplings may be eliminated, and useful shapes, such as tapers may be employed for parts of the system.

Figure 4:
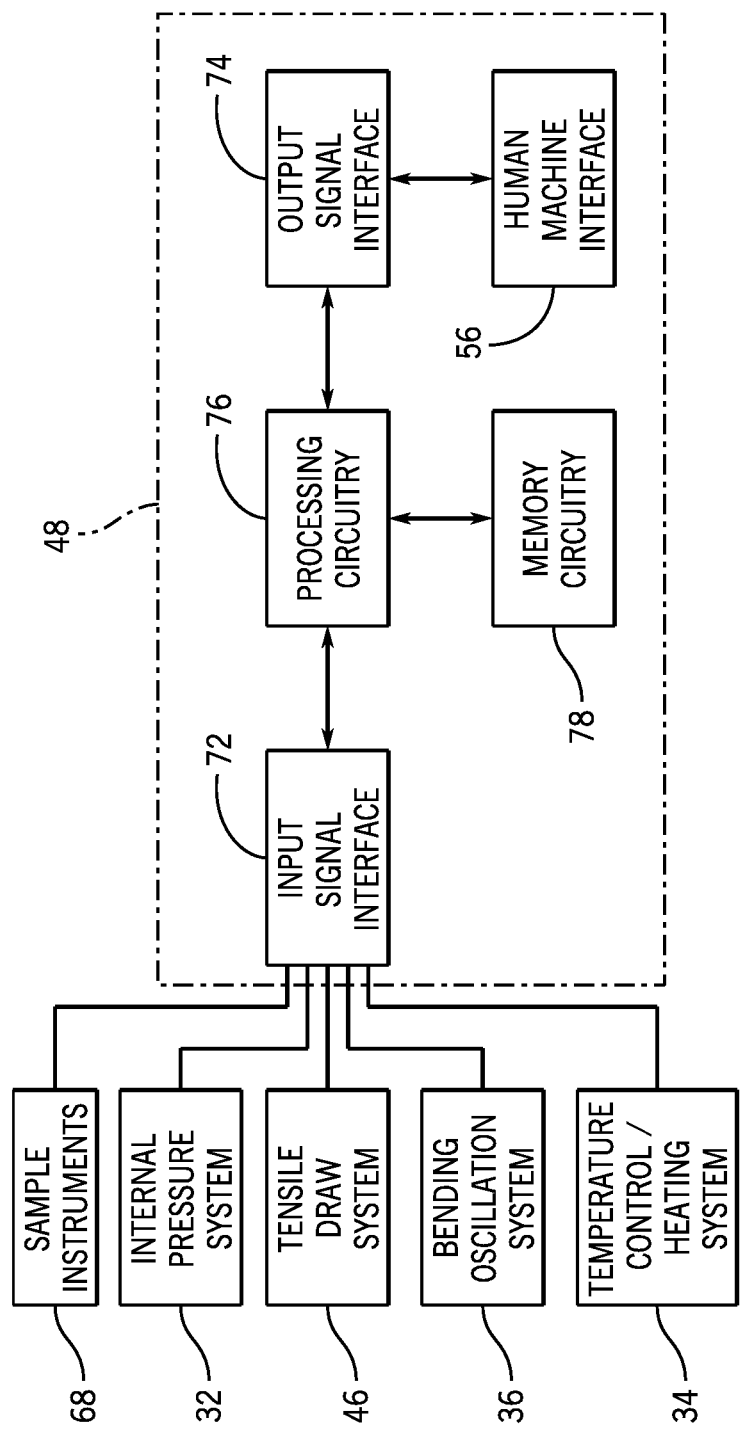
FIG. 4 is a block diagram of exemplary components for performing tests in the system and for receiving and analyzing test data.

FIG. 4 is an overall view of the system discussed above. As shown, the subsystems 32, 34, 36 and 46 are placed in data communication with the control system 48, as are the sample instruments. Of course, various data busses, converters, and interface circuitry and devices may be involved in such connections, as will be readily apparent to those skilled in the art. The control system 48, for its part, will include input signal interface circuitry 72, such as for performing such operations as receiving, converting, conditioning, and filtering of the received signals and data. Similarly, output signal interface circuitry 74 is provided for creating and applying control signals to the subsystems by operations such as amplification, conversion, scaling, and so forth. The interface circuitry is coupled to processing circuitry 76, such as one or more digital signal processors, microprocessors, and the like (along with its associated components, such as converters, power supplies, and so forth). Memory circuitry 78 is provided for the processing circuitry and may include both volatile and non-volatile memory as needed for the testing envisaged. In practice, the memory circuitry will store coded instructions and programming that is executed by the processing circuitry based on test protocols, operator inputs, configuration parameters of the subsystems, and so forth. The memory circuitry may also store raw and processed data and files resulting from tests performed.

Figure 5:
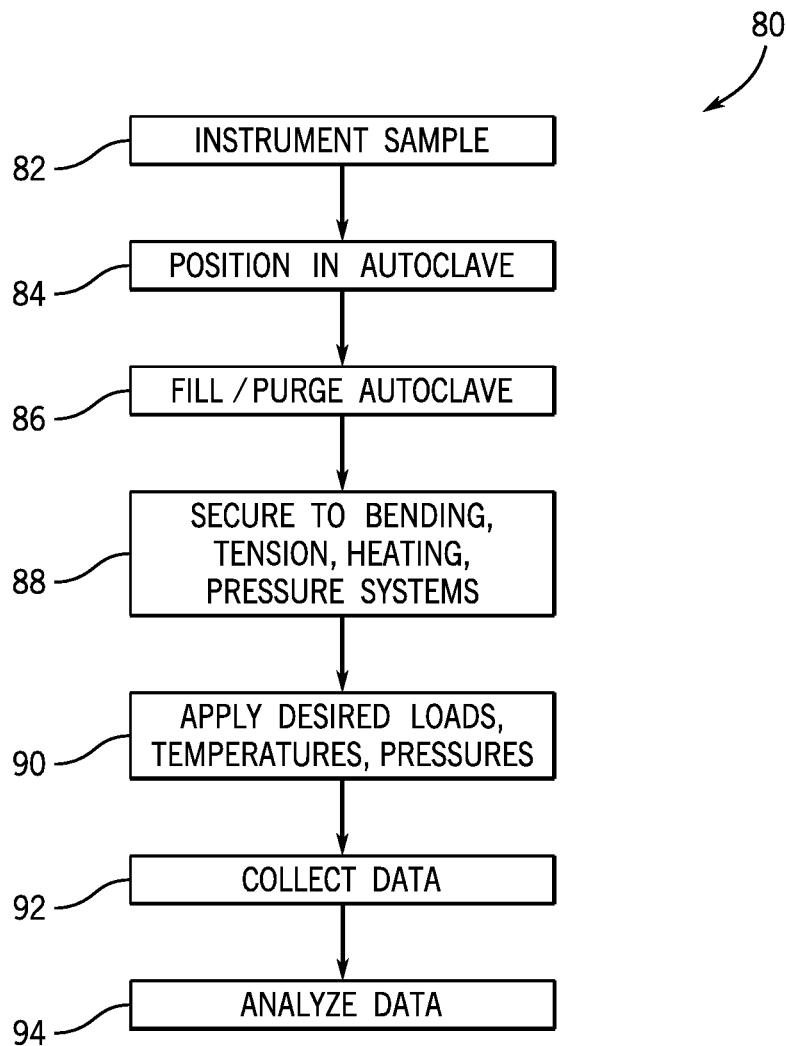
FIG. 5 is a flow chart of exemplary logic for performing testing with the system.

FIG. 5 illustrates exemplary logic 80 that may be followed in the setup and testing of samples in the system described above. As illustrated, in a first operation 82 the sample is instrumented. As noted, this may involve the application of strain gauges or any other useful instruments to the sample, and these are coupled to any transmission wiring (or wireless systems) for reading signals from the instruments during tests. The sample is then positioned in the autoclave (i.e., the chamber assemblies) and secured for application of mechanical loads. Once sealed in the device, then, the chambers may be filled and/or purged with the desired fluid, as indicated by operation 86. It should be noted that where desired, the interior of a tubular sample may be filled with one fluid while a different fluid surrounds the outer surface of the sample to simulate actual use conditions. The subsystems involved in the prescribed test protocol may then be secured or connected to the chamber(s) and sample, as indicated at operation 88. In some protocols, all of the subsystems will be called for, though in general the process allows for fewer than all of them to be prescribed and used. At operation 90 the testing is performed, such as by application of desired pressures, temperatures, tensile and bending loading. Of course, these may be applied in various combination, cycles, rates, and so forth as called for by the test protocol stored in the memory circuitry, and modified by any operator input parameters. At operation 92 data is collected. In contemplated embodiments, this will include logs of all of the desired test parameters (e.g., pressures, temperatures, and mechanical loads) that may be time-stamped to permit correlation with one another. Finally, at operation 94 the data is analyzed, such as by calculations of elongation, stresses, strains, graphical presentation of applied loads/conditions and the resulting sample performance, and so forth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A testing apparatus comprising:
an elongated chamber in which a sample may be secured, the chamber being sealable to capture a fluid environment therein the elongated chamber comprising a fixed chamber and a movable or flexible chamber, the fixed chamber and the movable or flexible chamber being sealingly jointed to one another;
a framework in which the fixed and the movable or flexible chambers are secured to support the chambers and to resist loading applied to the chambers during testing;
a pressurizing system that, in operation, creates a desired pressure the fluid environment within the elongated chamber in which the sample is secured;
a thermal system that, in operation, creates a desired temperature in the fluid environment within the elongated chamber in which the sample is secured;
a first loading system that, in operation, imposes a tensile or compressive load on the sample via the elongated chamber; and
a second loading system that, in operation, imposes a bending load on the sample via the elongated chamber;
wherein testing of the sample may comprise any combination or all of desired fluid environment, temperature, tensile and/or compressive load, and tensile load.

2. The apparatus of claim 1, wherein the elongated chamber comprises an autoclave at one end thereof, and a tubular member extending from the autoclave.

3. The apparatus of claim 1, wherein the elongated chamber is coupled to the framework that secures the chamber during testing, and that supports the first and second loading systems to permit imposition of desired loading.

4. The apparatus of claim 3, wherein the framework comprises a track and a slide that support movement of the sample in bending during imposition of the bending load by a hydraulic cylinder.

5. The apparatus of claim 3, wherein the framework comprises a plate that supports imposition of the tensile or compressive load by a hydraulic cylinder.

6. The apparatus of claim 5, wherein the plate is provided on a slide that support movement of the sample in bending during imposition of the bending load.

7. The apparatus of claim 1, wherein the chamber is capable of pressures of approximately 35,000 PSI.

8. The apparatus of claim 1, wherein the thermal system is capable of desired temperatures of between approximately 0F and 450F.

9. The apparatus of claim 1, wherein the first loading system is capable of tensile loads of up to approximately 5000 lbs. to 250,000 lbs.

10. The apparatus of claim 1, wherein the second loading system is capable of bending displacements of up to approximately +/−2 ft. along a length of between approximately 6 and 30 ft.

11. A testing apparatus comprising:
an autoclave comprising an elongated flexible chamber in which a sample secured during testing;
a framework in which the autoclave is secured to support the chamber and to resist loading applied to the chamber during testing;
a pressurizing system that, in operation, creates a desired pressure within the autoclave in which the sample is secured;
a thermal system that, in operation, creates a desired temperature within the autoclave in which the sample is secured;
a first loading system that, in operation, imposes a tensile or compressive load on the sample via flexing of the autoclave; and
a second loading system that, in operation, imposes a bending load on the sample via flexing of the autoclave;
wherein testing of the sample comprises any combination or all of a desired fluid environment, temperature, tensile and/or compressive load, and tensile load.

12. The apparatus of claim 11, wherein the framework comprises a track and a slide that support movement of the sample in bending during imposition of the bending load by a hydraulic cylinder.

13. The apparatus of claim 11, wherein the framework comprises a plate that supports imposition of the tensile or compressive load by a hydraulic cylinder.

14. The apparatus of claim 13, wherein the plate is provided on a slide that support movement of the sample in bending during imposition of the bending load.

15. The apparatus of claim 11, wherein during testing the chamber is subjected to internal pressures of up to approximately 35,000 PSI.

16. The apparatus of claim 11, wherein during testing the thermal system creates within the chamber temperatures of up to approximately 450F.

17. The apparatus of claim 11, wherein during testing the first loading system produces tensile loads of up to approximately 250,000 lbs.

18. A testing apparatus comprising:
   an autoclave comprising an elongated flexible chamber in which a sample secured during testing, the chamber and sample being flexed under tensile and bending loading during testing;
   a framework in which the autoclave is secured to support the chamber and to resist loading applied to the chamber during testing;
   a pressurizing system that, in operation, creates a desired pressure within the autoclave in which the sample is secured;
   a thermal system that, in operation, creates a desired temperature within the autoclave in which the sample is secured;
   a first loading system that, in operation, imposes a tensile or compressive load on the sample via flexing of the autoclave; and
   a second loading system that, in operation, imposes a bending load on the sample via flexing of the autoclave;
   wherein testing of the sample comprises any combination or all of a desired fluid environment, temperature, tensile and/or compressive load, and tensile load.

19. The apparatus of claim 18, wherein during testing the framework and the loading systems are configured to impose bending displacements of up to approximately +/−2 ft. along a length of between approximately 6 and 30 ft.

20. The apparatus of claim 18, wherein the chamber is configured to receive a desired fluid in which the sample is placed during testing.

* * * * *